(12) United States Patent
Miyazawa

(10) Patent No.: US 6,599,068 B1
(45) Date of Patent: Jul. 29, 2003

(54) TOOL HOLDER

(75) Inventor: Hiroshi Miyazawa, Akashi (JP)

(73) Assignee: Pascal Kabushiki Kaisha, Hyogo (JP)

( * ) Notice: Subject to any disclaimer, the term of this patent is extended or adjusted under 35 U.S.C. 154(b) by 0 days.

(21) Appl. No.: 10/009,248

(22) PCT Filed: Apr. 10, 2000

(86) PCT No.: PCT/JP00/02338
§ 371 (c)(1),
(2), (4) Date: Dec. 4, 2001

(87) PCT Pub. No.: WO01/76814
PCT Pub. Date: Oct. 18, 2001

(51) Int. Cl.[7] .......................... B23C 5/26; B23B 31/117
(52) U.S. Cl. .................... 409/234; 279/103; 408/143
(58) Field of Search .................. 408/143; 279/103; 409/234, 141

(56) References Cited

U.S. PATENT DOCUMENTS

| | | | | |
|---|---|---|---|---|
| 4,621,960 A | * | 11/1986 | Tollner | 409/232 |
| 4,714,389 A | * | 12/1987 | Johne | 409/233 |
| 4,934,883 A | * | 6/1990 | Andersson et al. | 409/234 |
| 5,030,047 A | * | 7/1991 | Pfalzgraf | 409/234 |
| 5,125,776 A | * | 6/1992 | Muller et al. | 409/234 |
| 5,322,304 A | * | 6/1994 | Rivin | 279/103 |
| 5,595,391 A | * | 1/1997 | Rivin | 279/103 |
| 5,716,173 A | * | 2/1998 | Matsumoto | 408/239 A |
| 5,775,857 A | * | 7/1998 | Johne | 409/234 |
| 5,964,556 A | * | 10/1999 | Toyomoto | 409/234 |
| 5,975,816 A | * | 11/1999 | Cook | 409/131 |
| 5,997,226 A | * | 12/1999 | Tagami | 409/231 |
| 6,071,219 A | * | 6/2000 | Cook | 483/1 |
| 6,224,306 B1 | * | 5/2001 | Hiroumi et al. | 409/234 |
| 6,352,395 B1 | * | 3/2002 | Matsumoto et al. | 409/234 |

FOREIGN PATENT DOCUMENTS

JP 07096437 A * 4/1995 ............ B23Q/3/12

* cited by examiner

Primary Examiner—Steven C. Bishop
(74) Attorney, Agent, or Firm—Darby & Darby

(57) ABSTRACT

A tool holder includes a plurality of elastic engagement pieces arrayed along an outer perimeter of a shank. During and after assembly, the elastic engagement pieces elastically abut at least an inner surface of a tapered hole in a main shaft joined to the tool holder and deform slightly in a radial direction. The elastic engagement pieces provide uniform engagement force with the main shaft over a broad surface area. An elastic flange provides additional elastic engagement and easy separation from the main shaft. Together, the elastic engagement pieces and elastic flange reliably engage and securely attach the main shaft to the tool holder while aiding disengagement.

16 Claims, 6 Drawing Sheets

TOOL HOLDER

This is a U.S. national phase application under 35 U.S.C. ¶371 of International Patent Application No. PCT/JP00/02338 filed Apr. 10, 2000. The International Application was published in Japanese on Oct. 18, 2001 as WO 01/76814 A1 under PCT Article 21(2).

BACKGROUND OF THE INVENTION

1. Field of the Invention

The present invention relates to a tool holder that reliably secures a tool along a main shaft of a machine tool.

2. Description of the Related Art

Conventionally a tool holder is attached to the end of a main shaft to support a tool. This type of attachment is used in various machine tools including drill presses, milling machines, and machining centers.

With conventional tool holders, a main shaft rotates the tool to perform machining on a workpiece. Since the tool holder is removably attached to the main shaft, the main shaft is equipped with a retraction mechanism to draw in and secure a shank of the tool holder.

Conventional tool holders include a tool support section for attaching a tool, a shank including a tapered outer perimeter surface, a pull stud secured to the shank, and a flange having a larger diameter than the tapered hole.

Conventionally, the retraction mechanism pulls in the tool holder and fits and secures the shank to the tapered hole of the main shaft.

Unfortunately, high machining precision, of 1 micron error or less, is demanded from recent machining tools. During use, machining tools must operate while rotating the main shaft at high speeds of 30,000–40,000 rpm.

Consequently, the tool holder and the main shaft (rotating at high speeds) undergo undesirable rotary vibrations, which are a factor in degrading machining precision.

To minimize precision loss, it is desirable to increase securing strength by tightly securing the entire shank of the tool holder against the tapered hole of the main shaft. Unfortunately, due to machining tolerances in the tapered hole of the main shaft and the tool holder, the tool can heat up during use, resulting in detrimental thermal expansion of both the main shaft and the tool holder. Detrimental thermal expansion makes it impossible to secure the entire shank of the tool holder firmly and tightly against the tapered hole of the main shaft.

It is also impossible to abut the flange of the tool holder tightly to the end surface of the main shaft while having the shank of the tool holder tightly secured in the tapered hole of the main shaft. Consequently, conventional tool holders are not designed to abut the end surface of the main shaft.

Japanese laid-open patent publication number 8-108302 discloses a tool holder which includes a main holder unit having a shank and a flange. A sleeve is outwardly fitted to the shank so that it can move along an axial direction relative to the shank. The sleeve also has an outer perimeter surface with the same tapered shape as the tapered hole of the shank. An elastic member is interposed between the flange and the sleeve.

The sleeve is divided at one section along the perimeter, with the elastic body mounted in the resulting gap. When the retraction mechanism draws in the tool holder, the flange abuts the end surface of the main shaft. The sleeve is elastically pressed by the elastic member toward the base end of the main shaft. The sleeve is narrowed and engages the tapered hole and couples with the shank.

Japanese laid-open patent publication number 9-248727 discloses a tool holder, formed as described above, but instead of the sleeve with a division at one section, a sleeve with an inner groove at one section along the perimeter is used. With both above-described tool holders, the overall sleeve diameter is narrowed when the retraction mechanism pulls in the tool holder. As a result of this narrowing, the tapered outer perimeter surface of the sleeve cannot be tightly fitted and secured against the tapered hole. This makes it difficult to have a uniform contact force over the entire perimeter and provide secure coupling with the inner surface of the tapered hole. As a further detriment to this design, an increased number of parts is required and the structure is correspondingly complex, thus increasing manufacturing costs.

In a tool holder presented in Japanese laid-open patent publication number 7-96437, a ring-shaped groove is formed at the boundary between the shank and the flange. The ring-shaped groove allows a section of the flange to have a reduced thickness. When the tool holder is drawn in by the retraction mechanism, the flange abuts the end surface of the main shaft and is elastically deformed slightly, and acts as a disc spring. This mechanism engages the shank and the tapered hole. Unfortunately, the structure of the shank is the same as previous conventional shank structures, and roughly the same problems therefore exist as in conventional tool holders.

OBJECTS AND SUMMARY OF THE INVENTION

It is an object of the present invention to provide a tool holder which overcomes the drawbacks of the related art noted above.

It is another object of the present invention to provide a tool holder which provides both a firm and elastic fit of an entire shank in a tapered hole of a main shaft.

It is another object of the present invention to provide a tool holder which allows a flange to elastically abut an outer end surface of a main shaft.

It is another object of the present invention to provide a tool holder which prevents vibrations, greatly increases stability, and prevents loosening during use.

The present invention relates to a tool holder including a plurality of elastic engagement pieces arrayed along an outer perimeter of a shank. During and after assembly, the elastic engagement pieces elastically abut at least an inner surface of a tapered hole in a main shaft joined to the tool holder and deform slightly in a radial direction. The elastic engagement pieces provide uniform engagement force with the main shaft over a broad surface area. An elastic flange provides additional elastic engagement and easy separation from the main shaft. Together, the elastic engagement pieces and elastic flange reliably engage and securely attach the main shaft to the tool holder while aiding disengagement.

According to an embodiment of the present invention there is provided a tool holder apparatus, for securing a tool support section on a tool to a main shaft of a machining tool, comprising: at least a shank on the tool support section, the main shaft including a tapered hole, means for elastically securing the shank in the tapered hole of the main shaft and eliminating vibration and attachment failure during a use of the machining tool, a plurality of elastic engagement pieces in the means for removably securing, the elastic engagement pieces arrayed concentrically around an outer perimeter section of the shank, the elastic engagement pieces extending away from the shank and elastically abutting an inner surface of the tapered hole during an insertion of the shank into the tapered hole, and the elastic engagement pieces elastically deforming in a radial direction during the insertion, whereby the means for removably securing enables the elastic engagement pieces to absorb a plurality of use vibrations while maintaining a secure attachment to the main shaft.

According to another embodiment of the present invention there is provided a tool holder apparatus, further comprising: a plurality of ring-shaped grooves on an outer perimeter section of the shank, the plurality of ring-shaped grooves arrayed alternatingly with the plurality of elastic engagement pieces in an axial direction along the outer perimeter of the shank, the plurality of ring-shaped grooves being smooth radius contours, thereby minimizing elastic stress concentration, and the plurality of elastic engagement pieces extending integrally from shank, thereby simplifying manufacturing and assembly of the tool holder.

According to another embodiment of the present invention there is provided a tool holder apparatus, wherein: the plurality of ring-shaped grooves being positioned along the axial direction at a first diameter parallel to a central axis of the shank, the plurality of elastic engagement pieces each being a first length extending from each the respective ring-shaped groove to a sloped inner surface of the tapered hole, ends of each the elastic engagement piece arrayed in a plane parallel to the sloped inner surface, whereby each the elastic engagement piece contacts the sloped inner surface simultaneously during the insertion to provide easy alignment and tight attachment, and the first length of each the elastic engagement piece being dependant upon a position on the shank relative to the sloped inner surface, whereby the first length of the elastic engagement piece at a narrow side of the shank is smaller than the first length of the elastic engagement piece at a wide side of the shank, thereby increasing an elastic modulus of each the elastic engagement piece along the axial direction to beneficially resist vibrational loosening.

According to another embodiment of the present invention there is provided a tool holder apparatus, wherein: each the elastic engagement piece is sloped toward the narrow side of the shank relative to a plane perpendicular to the central axis, and each the ring-shaped groove is oriented toward the narrow side of the shank relative to a plane perpendicular to the central axis, whereby the plurality of elastic engagement pieces resist removal of the shank from the tapered hole.

According to another embodiment of the present invention there is provided a tool holder apparatus, wherein: each the elastic engagement piece extends from the shank in a plane perpendicular to the central axis.

According to another embodiment of the present invention there is provided a tool holder apparatus, wherein: each elastic engagement piece is sloped toward the wide side of the shank relative to a plane perpendicular to the central axis, and each the ring-shaped groove is oriented toward the wide side of the shank relative to a plane perpendicular to the central axis, whereby the plurality of elastic engagement pieces enables easy removal after use while ensuring tight attachment to the main shaft.

According to another embodiment of the present invention there is provided a tool holder apparatus, further comprising: at least one elastic flange on the shank, the elastic flange extending from the shank and abutting an outer end surface of the main shaft during the insertion, the elastic flange abutting the outer end surface along a continuous radius and providing an increased stability between the shank and the main shaft during the insertion and the use, and the elastic flange elastically deforming away from the outer end surface shank during the insertion, thereby urging the shank out of the tapered hole during a removal.

According to another embodiment of the present invention there is provided a tool holder apparatus, wherein: the at least one elastic flange having a ring shape with a circular abutting piece at an outer diameter, a ring-shaped groove on the elastic flange at a radially inward position opposite the circular abutting piece, and a ring-shaped sloped groove on the elastic flange at a radially outward position opposite the ring-shaped groove, whereby the ring-shaped groove and the ring-shaped sloped groove assist the elastic flange in elastically urging the tool holder from the tapered hole during the removal.

According to another embodiment of the present invention there is provided a tool holder apparatus, wherein: the plurality of elastic engagement pieces are a plurality of collar-shaped members individually secured to an outer perimeter section of the shank.

According to another embodiment of the present invention there is provided a tool holder apparatus, wherein: the plurality of elastic engagement pieces are a plurality of flat springs mounted on an outer perimeter section of the shank, and the plurality of flat springs being between the shank and the tapered hole.

According to another embodiment of the present invention there is provided a tool holder apparatus, further comprising: at least a first groove on the shank, the at least first groove on an outer diameter of the shank, and at least a first key extending from the tapered hole and engaging the first groove on the shank and allowing easy torque transfer from the main shaft to the tool support section during the use while enabling the insertion.

According to another embodiment of the present invention there is provided a tool holder apparatus, wherein: a cross-section of the tapered hole and the shank along a plane perpendicular to the center axis being a non-circular shape, the tapered hole having a non-circular inner surface parallel to a non-circular outer surface of the shank, at least a first groove in the plurality of elastic engagement pieces, and at least a first projection extending from the shank and engaging the non-circular inner surface during the use, whereby the at least first projection engages the non-circular inner surface and prevents rotation of the tool holder relative to the main shaft during the use.

According to another embodiment of the present invention there is provided a tool holder apparatus, wherein the plurality of ring-shaped grooves have smooth radius contours, thereby minimizing elastic stress concentration.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
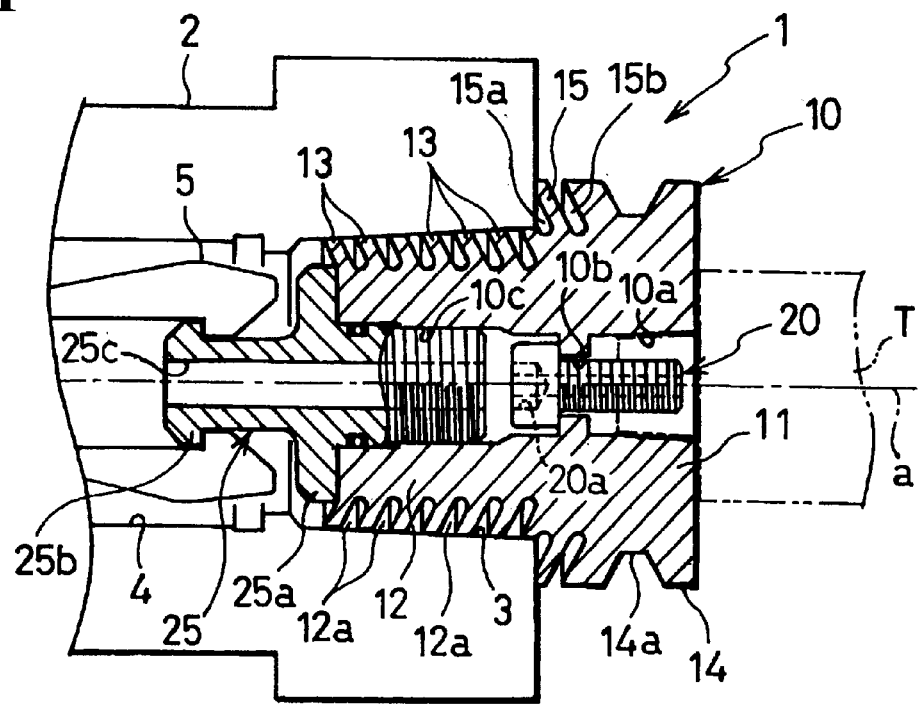
FIG. 1 is a vertical cross-section view of a tool holder including a section of a main shaft.

Referring now to FIG. 1, a tool holder 1, includes a main holder unit 10, mounted to a main shaft 2 of a machine tool (not shown). A tapered hole 3 extends inward from an end of main shaft 2. Tapered hole 3 is larger at a first end of main shaft 2 and narrows towards a center axis, as shown. The axial center of tapered hole 3 is aligned with an axis a of main shaft 2.

The end surface of main shaft 2 is a flat surface extending perpendicular to axis a. A holding hole 4, inside main shaft 2, extends continuously with tapered hole 3. A collet 5 is disposed at the end of a draw bar extending from a retraction mechanism (not shown). Collet 5 retracts and secures a shank 12 of tool holder 1 in tapered hole 3 of main shaft 2.

Tool holder 1 includes main holder unit 10, shank 12, a locking bolt 20, and a pull stud 25. A tool support 11 attaches a tool T to shank 12 to allow tool T to be removably fitted and secured in tapered hole 3. A plurality of elastic engagement pieces 13 are disposed along an outer perimeter section of shank 12. A flange 14, extending around main holder unit 10, has a diameter larger than that of tapered hole 3. Tool support 11, shank 12, elastic engagement pieces 13 and flange 14 are integrally formed during manufacture. Elastic engagement pieces 13 may be separately formed, as will be explained.

A tapered hole 10a, an insertion hole 10b, and a threaded hole 10c extend in series inside main holder unit 10. During assembly, a locking bolt 20 is inserted through threaded hole 10c into insertion hole 10b. Locking bolt 20 includes a threaded section which projects through insertion hole 10b and extends into tapered hole 10a.

A connecting projection at the base of tool T tightly engages tapered hole 10a and threadably meshes with threaded locking bolt 20 to lock tool holder 1 to tool T. Tool support 11 includes tapered hole 10a, insertion hole 10b, and locking bolt 20.

A pull stud 25 meshes with threaded hole 10c at a base end of main holder unit 10. A collar 25a extends radially from pull stud 25 abutting the end of shank 12. Since collar 25a has a radial surface in contact with shank 12 and threadably engages threaded hole 10c, collar 25a provides strong lateral support to secure stud 25 and assists vibration compensation, as will be explained.

An engagement section 25b extends at the base end of pull stud 25 and positively engages collet 5 and draws inward shank 12 by pulling the draw bar (not shown) to the left in FIG. 1.

A hexagonal hole 20a extends axially in locking bolt 20 to allow easy access for a hexagonal wrench (not shown) to engage and rotate locking bolt 20.

An insertion hole 25c extends axially in pull stud 25 to provide access to locking hexagonal hole 20a.

Elastic engagement pieces 13 extend from shank 12 along an outer perimeter away from the axial center of shank 12. When assembled, elastic engagement pieces 13 abut the inner surface of tapered hole 3 and are elastically deformed in the radial direction.

A plurality of ring-shaped grooves 12a are arrayed at the outer perimeter section of shank 12, positioned at predetermined axial intervals alternating with collar-shaped elastic engagement pieces 13. Ring-shaped grooves 12a are formed at the outer perimeter section of shank 12 to allow elastic engagement pieces 13 to extend integrally from shank 12.

An outer perimeter end of each elastic engagement piece 13 is sloped relative to a plane perpendicular with the axis of the shank 12 extending along the tapered shape of shank 12 (and tapered hole 3).

Each elastic engagement piece 13 has a high elasticity modulus, which makes them more easily elastically deformed during assembly due to the sloped outer perimeter end, described above.

An axial thickness of each elastic engagement piece 13 is pre-selected to provide an appropriate elastic modulus. The plurality of elastic grooves 12a are sloped grooves oriented toward the narrower end of shank 12.

During engagement of elastic engagement pieces 13 into tapered hole 3, the distance of respective elastic engagement pieces 13 from axial center a is greater at the bottom side of shank 12 (toward the right side in FIG. 1). The bottoms of ring-shaped grooves 12a are positioned at roughly a fixed radius and distance from axial center a. Consequently, a radial width of the plurality of elastic engagement pieces 13 is longer toward the wider end (bottom side) of the taper of shank 12. The last elastic engagement piece 13 at of tapered hole 3, is formed between ring-shaped groove 12a and a securing groove 15a, as will be described.

Figure 2:
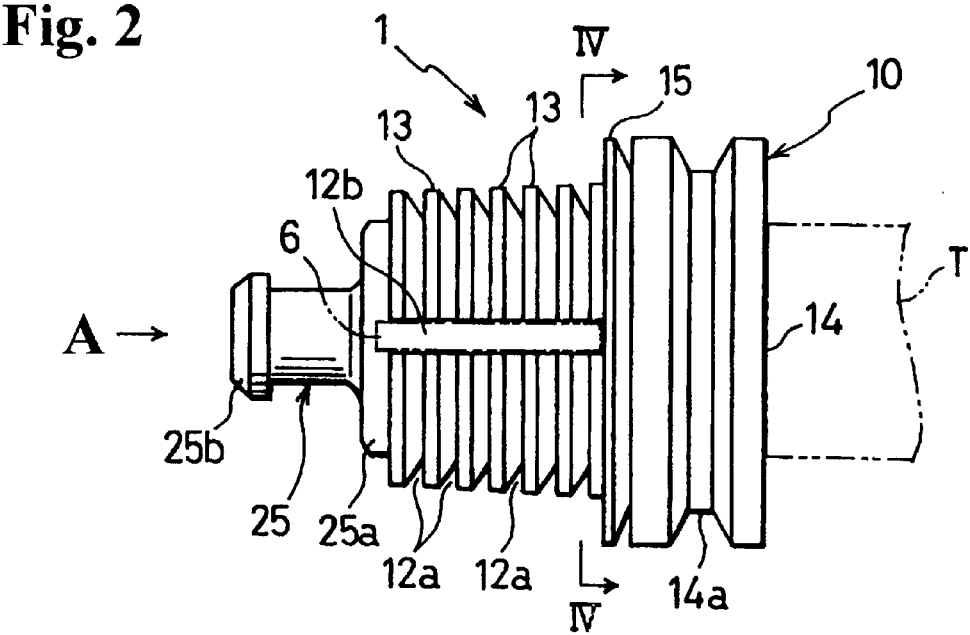
FIG. 2 is a side-view of the tool holder from FIG. 1.
Figure 3:
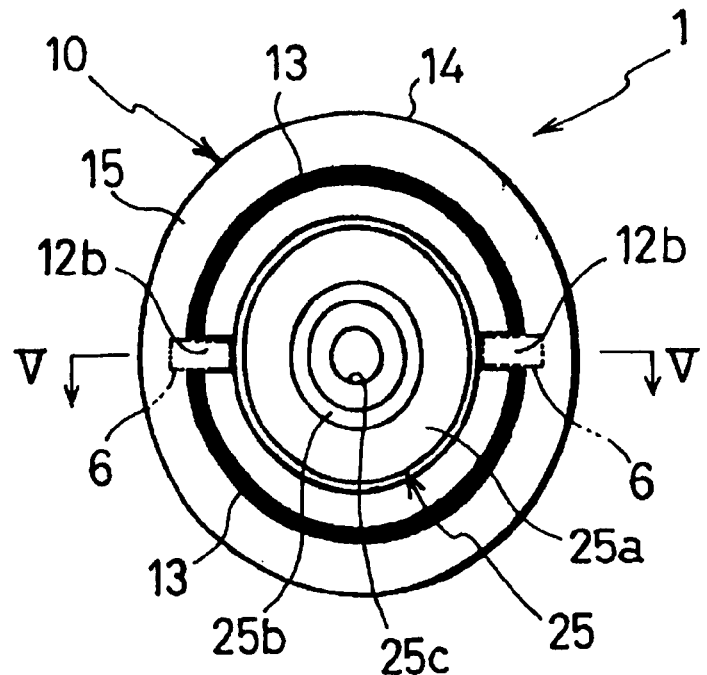
FIG. 3 is a drawing of FIG. 2 as seen from the direction indicated by arrow A in FIG. 2.
Figure 4:
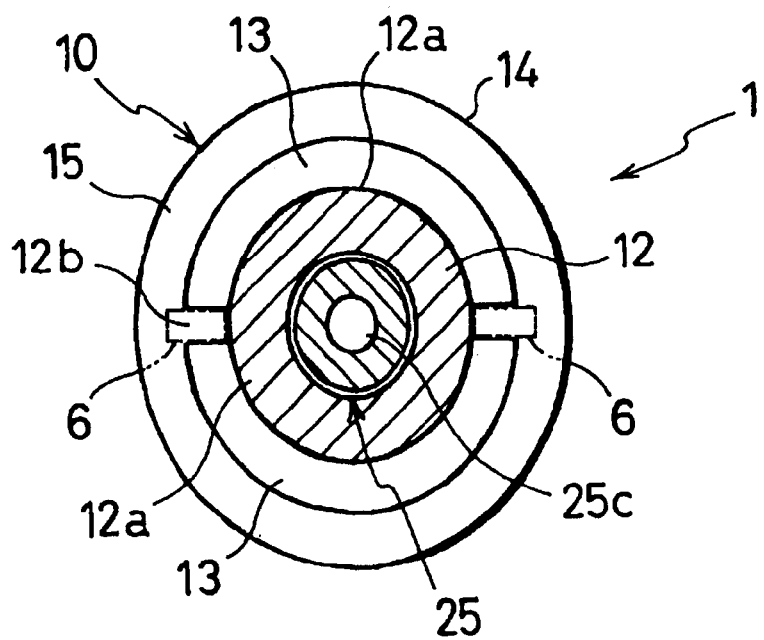
FIG. 4 is a cross-section taken along the IV—IV line in FIG. 2.

Referring now to FIGS. 2 through 4, a pair of grooves 12b, at the outer perimeter section of shank 12, extend longitudinally along shank 12 at symmetrical positions around axial center a. Consequently, elastic engagement pieces 13 are divided in two sections extending along the outer perimeter of shank 12. Each section of elastic engagement pieces 13 extends along an arc of approximately 170 degrees along the outer perimeter of the shank 12.

Combining grooves 12b and the division in elastic engagement pieces 13 by ring-shaped grooves 12a allows elastic engagement pieces 13 to be easily elastically deformed during use. In other words, these structures reduce the effective elastic modulus of elastic engagement pieces 13.

Figure 5:
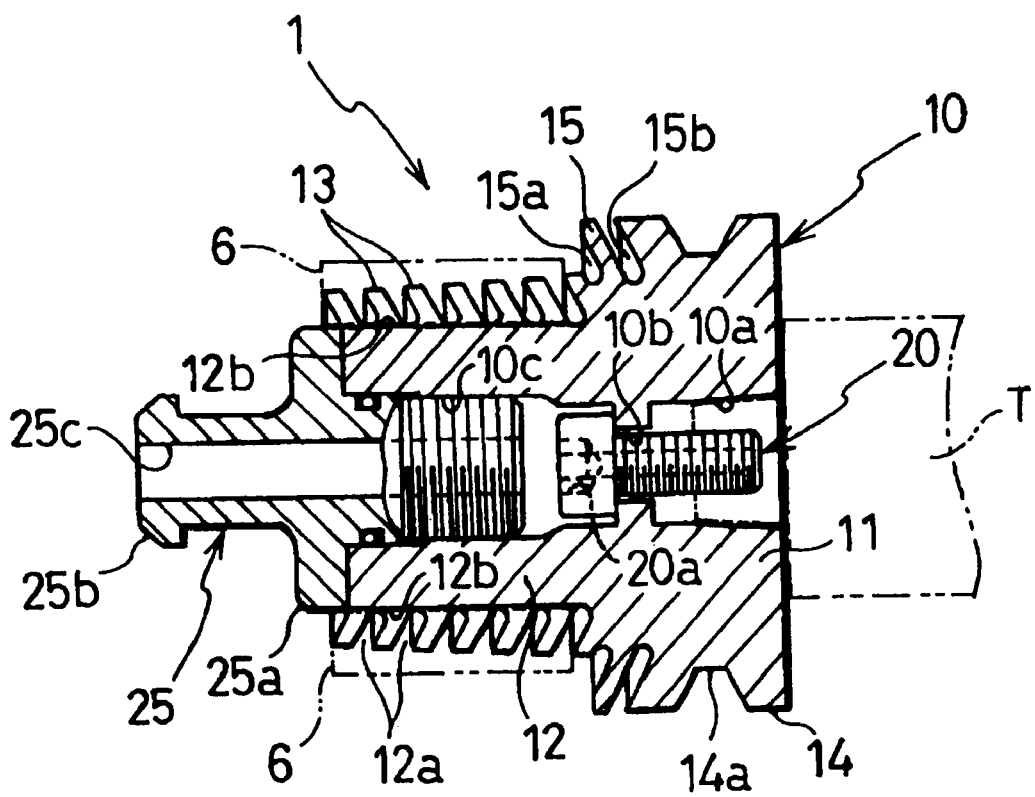
FIG. 5 is a cross-section taken along the V—V line in FIG. 3.

Referring now to FIG. 5, two keys 6 fixably extend from the inner surface of tapered hole 3 of main shaft 2 and engage grooves 12b when tool holder 1 is mounted on main shaft 2. Keys 6 and grooves 12b allow a rotational torque to be transferred from main shaft 2, through keys 6 to tool holder 1.

An outer perimeter section of the flange 14 includes an integrally formed engagement groove 14a that engages an arm of an automatic tool changing device (not shown) and allows easy and rapid replacement.

A ring-shaped elastic flange 15 is formed at a base end of flange 14 and has a high elastic modulus. When mounting main holder unit 10 on main shaft 2, elastic flange 15 is elastically deformed toward the axial center when it abuts the outer end surface of main shaft 2. Elastic flange 15 has a ring that slopes toward the outer end surface of main shaft 2. Additionally, when elastic flange 15 is elastically deformed, elastic flange 15 exerts a force against the outer end surface of main shaft 2 in the axial direction of shank 12.

A ring-shaped groove 15a is formed at a radially inward position on one side of elastic flange 15. A ring-shaped sloped groove 15b is formed at a radially outward position of elastic flange 15 opposite groove 15a. Groove 15a and sloped groove 15b reduce the high elastic modulus of elastic flange 15 to facilitates elastic deformation during assembly and use.

During assembly, shank 12 of tool holder 1 is inserted into tapered hole 3 of main shaft 2, and collet 5 of the retraction mechanism forcibly draws shank 12 into tapered hole 3.

Figure 6:
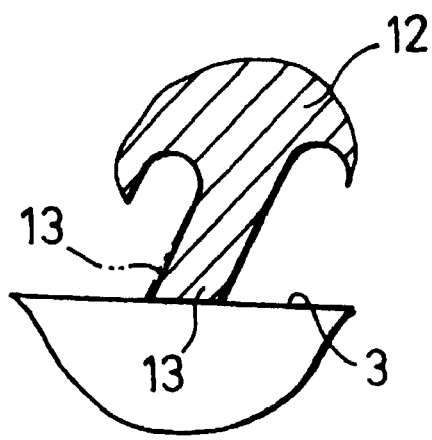
FIG. 6 is a detail drawing of an elastic engagement piece.

Referring now to FIG. 6, during assembly and drawing, the plurality of elastic engagement pieces 13 abut the inner surface of tapered hole 3 (solid lines) and are elastically deformed slightly in the radial direction, as indicated by the dotted lines. By having elastic engagement pieces 13 elastically deform radially and abut tightly against tapered hole 3, the entire shank 12 is firmly and removably fitted against the inner surface of tapered hole 3 with a uniform force along the entire length of shank 12.

Additionally, during assembly when tool holder 1 mounts on main shaft 2, elastic flange 15 abuts the end surface of main shaft 2 prior to elastic engagement pieces 13 abutting the inner surface of tapered hole 3. Consequently, when pull stud 25 is drawn in by the retraction mechanism (not shown), elastic flange 15 elastically deforms radially.

Since elastic flange 15 elastically contacts the end surface of main shaft 2, small gaps between main shaft 2 and tool holder 1 are easily eliminated while firmly fitting shank 12 against tapered hole 3. These two elastic engagement mechanism prevent undesirable vibrations in main shaft 2 and tool holder 1 even when main shaft 2 is operated at high speeds. As discussed above, eliminating undesirable vibrations significantly improves machining precision.

Since elastic flange 15 engages the end surface of main shaft 2 at a position where its radius from axial center a is maximized (large), vibrations and flexure in tool holder 1 is greatly reduced, thereby improving the stability of a tool in tool holder 1.

Since elastic engagement pieces 13 extend along the outer perimeter and axis of shank 12, the entire shank 12 is easily and reliably secured against the inner surface of tapered hole 3 with a uniform force. Additionally, the plurality of ring-shaped grooves 12a are integrally formed at uniform intervals along shank 12 to allow elastic engagement pieces 13 to be easily and integrally formed with shank 12. This integral formation simplifies the structure of main holder unit 10 and reduces manufacturing costs.

The elasticity of elastic engagement pieces 13 is regulated and controlled by multiple mechanisms. First, the elasticity of elastic engagement pieces 13 is regulated by forming elastic engagement pieces 13 in a slope along a plane generally perpendicular to axial center a. Second, the ends of elastic engagement pieces 13 are sloped relative to tapered hole 3 and allow uniform contact during insertion. Third, elastic engagement pieces 13 are split by grooves 12b to engage keys 6 extending from tapered hole 3 and provide a torque transfer link with main shaft 2 while increasing elasticity. Together, these mechanisms allow uniform tight fitting of shank 12 into tapered hole 3 while permitting shank 12 to be formed of a strong material with a high elastic modulus.

An additional benefit of sloping the outer ends of elastic engagement pieces 13, allows elastic engagement pieces 13 to be elastically deformed toward the narrower end of the tapered shape when tool holder 1 is mounted into tapered hole 3. Since the outer ends elastic engagement pieces 13 tightly fit against the inner surface of tapered hole 3 by friction, the elastic restorative force of elastic engagement pieces 13 moves tool holder 1 toward the base end of main shaft 2. Consequently, the retraction force drawing in tool holder 1 against collet 5 is increased and the drive force of the retraction device may be reduced.

As an additional benefit of the present design, when tool holder 1 is removed from main shaft 2, the drive force of the retraction mechanism is stopped, and the elastic restorative force of elastic flange 15 urges tool holder 1 in a release direction. This elastic restorative forces releases the elastic deformation of elastic engagement pieces 13 and allows easy removal of tool holder 1 with the arm of the automatic tool changer device (not shown). When necessary, an axial thickness of elastic flange 15 may be increased to accommodate different needs and groove 15a may be eliminated where necessary or desirable.

In additional embodiments, where desirable elastic engagement pieces 13 and elastic flange 15 may be formed to abut main shaft 2 simultaneously or engagement pieces 13 may engage main shaft 2 prior to elastic flange 15. When elastic flange 15 contacts main shaft 2 prior to elastic engagement pieces 13, as in the present design, there is an additional stability benefit, but alternative timing choices may be selected according to manufacturer or customer needs.

Figure 7:
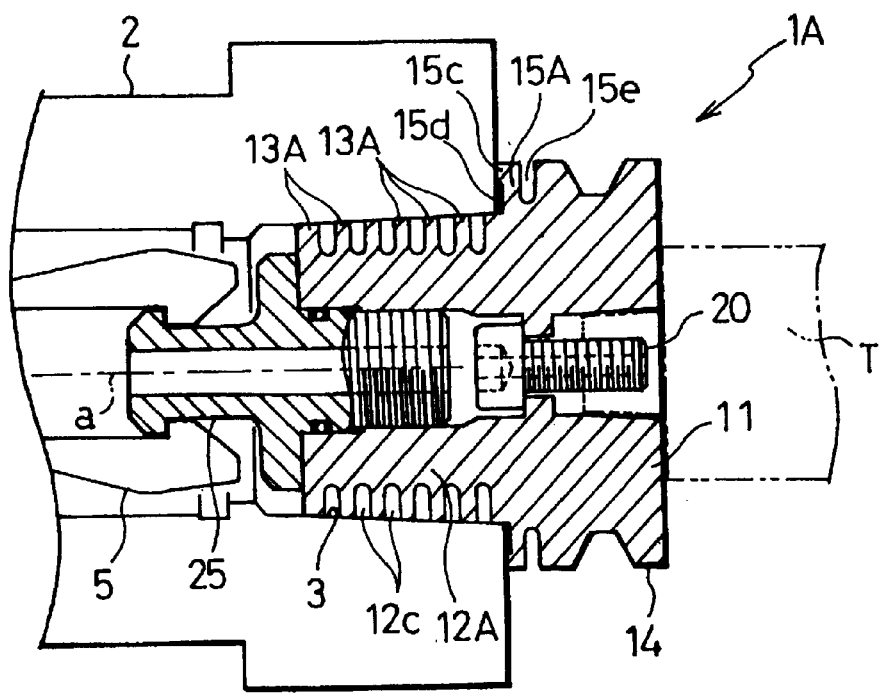
FIG. 7 is a vertical cross-section of a second embodiment of the present invention.

Referring now to FIG. 7, an alternative embodiment of a tool holder 1A includes a plurality of elastic engagement pieces 13A extending parallel to a plane perpendicular with axial center a of a shank 12A.

A plurality of ring shaped grooves 12c are on an outer perimeter section of shank 12A at predetermined axial intervals relative to elastic engagement pieces 13A. Ring shaped grooves 12c are parallel to a plane perpendicular to axial center a of shank 12A.

Elastic engagement pieces 13A are formed integrally with shank 12A and elastically engage the inner surface of tapered hole 3, during assembly, as noted above.

An elastic flange 15A extends from shank 12A perpendicular to axial center a, and an abutting piece 15c from an outer perimeter end. Abutting piece 15c extends from elastic flange 15A toward the end surface of main shaft 2. Abutting piece 15c abuts the end surface of main shaft 2 during assembly and aids in securing tool holder 1A to main shaft 2.

A ring-shaped groove 15d extends at a base end of elastic flange 15A between shank 12A and abutting piece 15c. Ring-shaped groove 15e is parallel with a plane perpendicular to axial center a of shank 12A and extends along elastic flange 15A, thus allowing elastic flange 15A to be easily and integrally formed with flange 14.

During assembly with this embodiment, when tool holder 1A is drawn in to main shaft 2, a force perpendicular to tapered hole 3 is applied to the outer perimeter surface of elastic flange 15A. This force elastically deforms elastic flange 15A slightly in the radial direction and provides a tight fit between tool holder 1A and main shaft 2.

Figure 8:
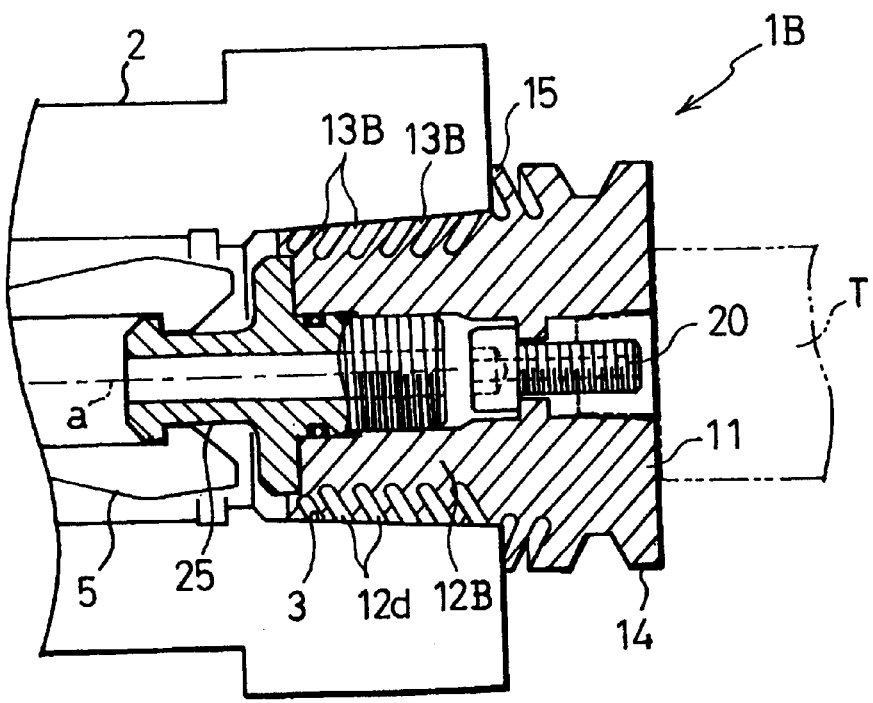
FIG. 8 is a vertical cross-section of a third embodiment of the present invention.

Referring now to FIG. 8, another alternative embodiment of a tool holder 1B includes a plurality of elastic engagement pieces 13B extending in a sloped direction toward the wider end of shank 12B relative to a plane perpendicular with axial center a of a shank 12B.

Elastic engagement pieces 13B are integrally formed with shank 12B. A plurality of ring-shaped grooves 12d are formed at the outer perimeter section of shank 12B at a predetermined intervals with elastic engagement pieces 13B. Ring-shaped grooves 12d sloped toward the wider end of shank 12B.

During assembly, when tool holder 1B is secured in tapered hole 3, elastic engagement pieces 13B elastically deformed slightly in the radial direction. In this state, due to the formation of elastic engagement pieces 13B and ring-shaped grooves 12d, elastic engagement pieces 13B apply an outward force to tool holder 1B, away from main shaft 2. This outward force allows easy removal of tool holder 1B from main shaft 2.

Figure 9:
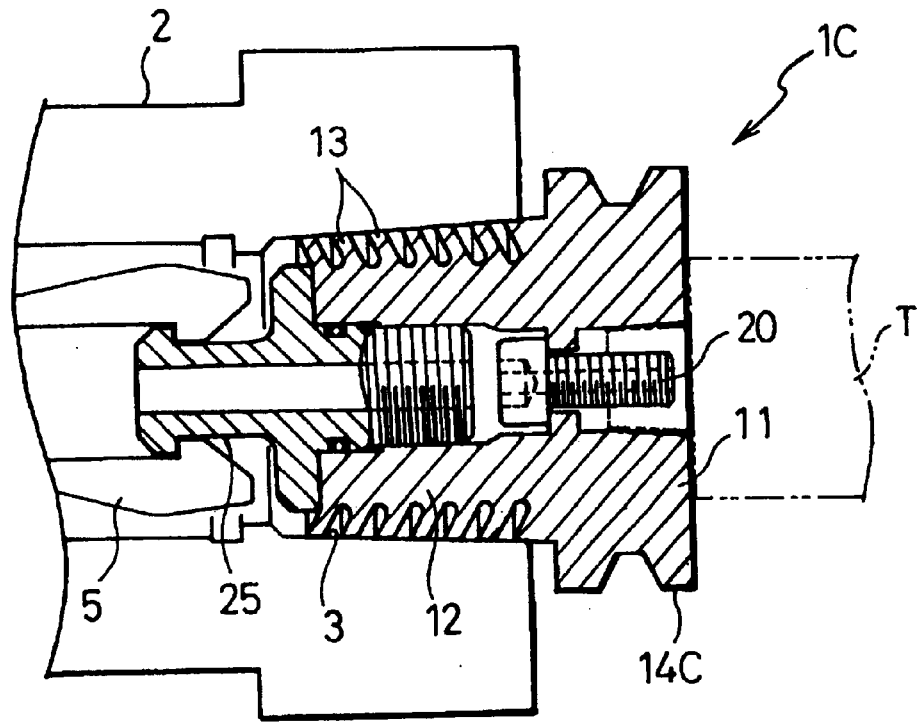
FIG. 9 is a vertical cross-section of a fourth embodiment of the present invention.

Referring now to FIG. 9, another alternative embodiment of a tool holder 1C exists without elastic flange 15, groove 15a, and sloped groove 15b. This embodiment is useful where there is minimal need for the benefits provided by these additional elements and may be selected by customers operating at lower speeds.

Figure 10:
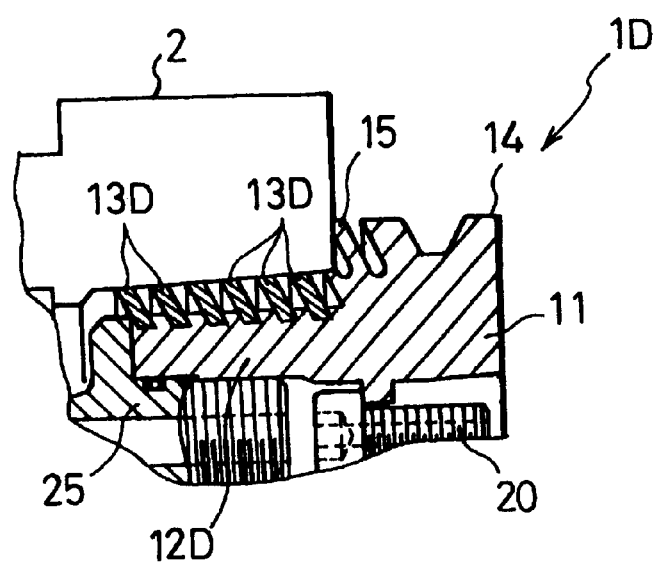
FIG. 10 is a close-up schematic vertical cross-section of an alternative embodiment of the present invention.

Referring now to FIG. 10 another alternative embodiment of a tool holder 1D includes a plurality of collar-shaped members 13D separately secured to respective ring shaped grooves along an outer perimeter of a shank 12D. Collar-shaped members 13D slope toward the narrow end of shank 12B and extend relative to a plane perpendicular with axial center (not shown) of shank 12D.

In the present embodiment, collar-shaped members 13D may alternatively be formed as rings, and a plurality of dividing bodies symmetrical relative to the axial center may be additionally placed between collar-shaped members 13D.

Collar-shaped members 13D may be separately secured to shank 12D in similar directions as elastic engagement pieces 13A or 13B.

The present embodiment allows collar-shaped members 13D to be selected according to a desired elastic modulus or material different from shank 12D, thereby allowing easy adaptability to customer and manufacturer demand.

Figure 11:
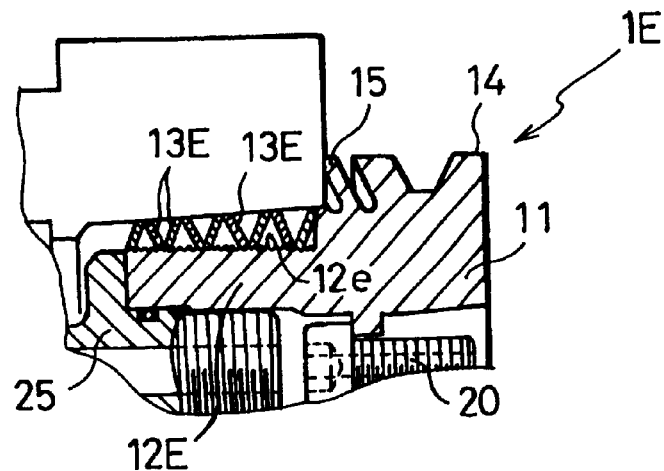
FIG. 11 is a close-up schematic vertical cross-section of an alternative embodiment of the present invention.

Referring now to FIG. 11, another alternative embodiment of a tool holder 1E includes a plurality of elastic engagement pieces formed as a plurality of ring-shaped disk springs 13E. Ring-shaped disk springs 13E have a high elastic modulus and are mounted on the outer perimeter of a shank 12E. Ring-shaped disk spring 13E are arranged between shank 12E and tapered hole 3 (not shown in this embodiment) to form a zig-zag cross-section pattern with the ends of adjacent disk springs 13E contacting each other.

During manufacture, a knurled section 12e is formed on an outer perimeter of shank 12E and provides a frictional link between the inner ends of disc springs 13E and shank 12E. This embodiment allows easy use of disk springs 13E and easy adaptability to differing elastic requirements.

Figure 12:
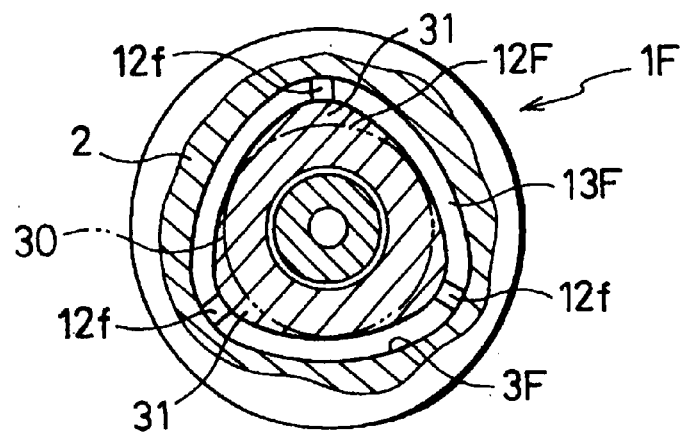
FIG. 12 is a vertical cross-section of a tool holder and a main shaft along a plane perpendicular to an axial center according to another embodiment of the present invention.

Referring now to FIG. 12, an alternative embodiment of a tool holder 1F includes a plurality of elastic engagement pieces 13F extending from a shank 12F to engage a tapered hole 3F of tool holder 2.

In the present embodiment, a cross-sectional shape of tapered hole 3F of the main shaft and shank 12F, along a plane perpendicular to the axial center of shank 12F, forms a non-circular triangular shape, as shown.

The triangular shape is formed by three projections 31 formed at 120 degree intervals along an outside of an inscribed reference circle 30. Projections 31 allow rotational torque to transfer from tapered hole 3F of the main shaft to shank 12F without the use of additional keys. Three grooves 12f are formed at symmetrical positions at the corners on the outer perimeter section of shank 12F, relative to the axial center of shank 12F. During use, since projections 31 cannot rotate beyond the apex of their respective non-circular triangular position without encountering increased resistance, they easily operate to transfer torque, Referring now to FIG. 13, an alternative embodiment of a tool holder 1G includes a plurality of elastic engagement pieces 13G extending from a shank 12G to engage a tapered hole 3G of tool holder 2.

In the present embodiment, a cross-sectional shape of tapered hole 3G of the main shaft and shank 12G, along a plane perpendicular to the axial center of shank 12F, forms a non-circular four-sided shape, as shown.

This four-sided shape is formed by four projections 33 extending at from shank 12G at 90 degree intervals along an outside of a reference circle 32. As with tool holder 1F in FIG. 12, projections 33 allow rotational torque to be transferred from tapered hole 3G of the main shaft to shank 12G without the use of keys, thereby simplifying assembly and use.

Four grooves 12g are in shank 12G at symmetrical positions relative to the axial center and at the corners of the outer perimeter.

Figure 13:
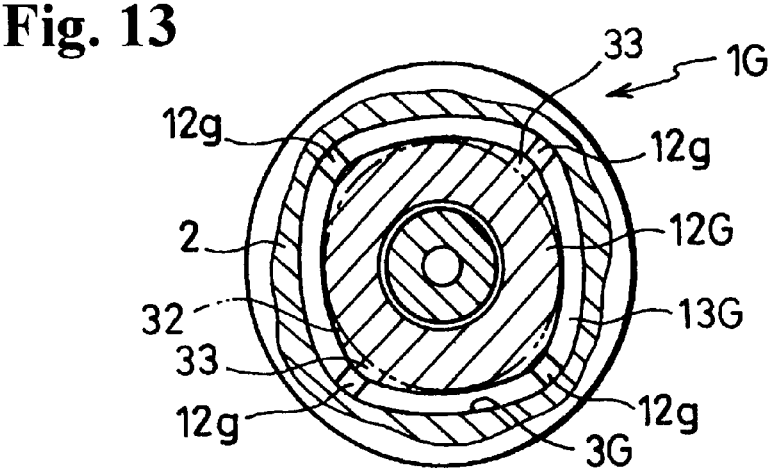
FIG. 13 is a vertical cross-section of a tool holder and a main shaft along a plane perpendicular to an axial center according to another embodiment of the present invention

In addition to the non-circular shapes indicated in the embodiments shown in FIGS. 12 and 13, other non-circular shapes may be used to provide the same benefit.

In other alternative embodiments, the grooves formed on the elastic engagement pieces 13–13B may be optionally omitted. One skilled in the instant art will also recognize that the number, thickness, and region of the elastic engagement pieces along the outer perimeter of the shank is readily adaptable to a desired retaining and elastic force.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the spirit and scope of this invention as defined in the following claims.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies entirely on friction between a wooden part and a cylindrical surface, a screw's helical surface positively engages the wooden part, and a bolt's head and nut compress opposite sides of at least one wooden part, in the environment of fastening wooden parts, a nail, a screw, and a bolt may be readily understood by those skilled in the art as equivalent structures.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tool holder, including a tool support section for securing a tool and a shank removably fitted and secured to a tapered hole of a main shaft of a machining tool, comprising:

a plurality of elastic engagement pieces on said shank;

said plurality of elastic engagement pieces disposed at an outer perimeter section of said shank at a plurality of positions along an axial center and abutting an inner surface of said tapered hole during an insertion and deforming in a radial direction;

said shank being fitted into said tapered hole of said main shaft during said insertion and secured to said main shaft with said plurality of elastic engagement pieces elastically deformed in said radial direction; and a plurality of grooves extending longitudinally along said shank formed at said outer perimeter section of said shank.

2. A tool holder, according to claim 1, further comprising:

a plurality of ring-shaped grooves formed at said outer perimeter section of said shank at predetermined intervals along said axial center, said plurality of ring-shaped grooves and said plurality of elastic engagement pieces being arranged in an alternating manner along said axial center; and said plurality of elastic engagement pieces being formed integrally with said shank by forming/said plurality of ring-shaped grooves.

3. A tool holder, according to claim 2, wherein: said elastic engagement pieces are sloped relative to a plane perpendicular to said axial center of said shank.

4. A tool holder, according to claim 3, wherein: said elastic engagement pieces are sloped toward a narrower end of a tapered shape of said shank.

5. A tool holder, according to claim 2, wherein: said elastic engagement pieces are formed parallel to plane perpendicular to said axial center of said shank.

6. A tool holder, according to claim 4, wherein said plurality of grooves extending longitudinally along said shank being formed in a symmetrical arrangement relative to said axial center.

7. A tool holder, according to claim 1, further comprising:

an elastic flange extending from said tool holder abutting an outer end surface of said main shaft and elastically deforming toward said axial center when said tool holder is mounted on said main shaft and said elastic flange exerting a force against said outer end surface.

8. A tool holder, according to claim 3, further comprising:

an elastic flange extending from said tool holder abutting an outer end surface of said main shaft and elastically deforming toward said axial center when said tool holder is mounted on said main shaft and said elastic flange exerting a force against said outer end surface.

9. A tool holder, according to claim 7, wherein:

said elastic flange is formed with a ring shape;

a ring-shaped groove is formed at a radially inward position on said elastic flange; and a ring-shaped sloped groove is formed at a radially outward position on said elastic flange.

10. A tool holder, according to claim 8, wherein:

said elastic flange is formed with a ring shape;

a ring-shaped groove is formed at a radially inward position on said elastic flange; and a ring-shaped sloped groove is formed at a radially outward position on said elastic flange.

11. A tool holder, according to claim 1, wherein: said plurality of elastic engagement pieces are a plurality of collar-shaped members secured to said outer perimeter section of said shank.

12. A tool holder, according to claim 1, wherein: said plurality of elastic engagement pieces are formed as a plurality of flat springs mounted on said outer perimeter section of said shank.

13. A tool holder, according to claim 1, wherein: a cross-section shape of said tapered hole and said shank along a plane perpendicular to said axial center forms a non-circular shape effective to transferring rotational torque during a use of said machining tool, whereby said rotational torque can be easily transferred from said tapered hole of said main shaft to said shank without using a key.

14. A tool holder, for securing a tool support section on a tool to a main shaft of a machining tool, comprising:

at least a shank on said tool support section;

said main shaft including a tapered hole;

means for elastically securing said shank in said tapered hole of said main shaft and eliminating vibration and attachment failure during a use of said machining tool;

a plurality of grooves extending longitudinally along said shank formed at an outer perimeter section of said shank;

a plurality of elastic engagement pieces in said means for elastically securing;

said elastic engagement pieces arrayed concentrically around an outer perimeter section of said shank;

said elastic engagement pieces extending away from said shank and elastically abutting an inner surface of said tapered hole during an insertion of said shank into said tapered hole; and said elastic engagement pieces elastically deforming in a radial direction during said insertion, whereby said means for elastically securing enables said elastic engagement pieces to absorb a plurality of use vibrations while maintaining a secure attachment to said main shaft.

15. A tool holder, according to claim 14, further comprising:

a plurality of ring-shaped grooves on said outer perimeter section of said shank;

said plurality of ring-shaped grooves arrayed alternatingly with said plurality of elastic engagement pieces in an axial direction along said outer perimeter of said shank;

said plurality of ring-shaped grooves being smooth radius contours, thereby minimizing elastic stress concentration; and said plurality of elastic engagement pieces extending integrally from shank, thereby simplifying manufacturing and assembly of said tool holder.

16. A tool holder, according to claim 14, wherein:

said plurality of ring-shaped grooves being positioned along said axial direction at a first diameter parallel to a central axis of said shank;

said plurality of elastic engagement pieces each being a first length extending from each said respective ring-shaped groove to a sloped inner surface of said tapered hole;

ends of each said elastic engagement piece arrayed in a plane parallel to said sloped inner surface, whereby each said elastic engagement piece contacts said sloped inner surface simultaneously during said insertion to provide easy alignment and tight attachment; and said first length of each said elastic engagement piece being dependant upon a position on said shank relative to said sloped inner surface; whereby said first length of said elastic engagement piece at a narrow side of said shank is smaller than said first length of said elastic engagement piece at a wide side of said shank, thereby increasing an elastic modulus of each said elastic engagement piece along said axial direction to beneficially resist vibrational loosening.

* * * * *